United States Patent [19]

Degelman

[11] Patent Number: 5,288,096
[45] Date of Patent: Feb. 22, 1994

[54] SELF ALIGNING HITCH

[76] Inventor: Paul W. Degelman, 272 Industrial Dr., Regina, Saskatchewan, Canada, S4P 3B1

[21] Appl. No.: 59,257

[22] Filed: May 10, 1993

[51] Int. Cl.$^5$ .................................. B60D 1/36
[52] U.S. Cl. ........................... 280/508; 280/477; 280/479.3
[58] Field of Search ............. 280/477, 479.3, 504, 280/508, 511

[56] References Cited

U.S. PATENT DOCUMENTS

| | | | |
|---|---|---|---|
| 2,871,029 | 1/1959 | Demarest | 280/504 |
| 3,099,462 | 7/1963 | Lent | 280/479.3 |
| 4,008,905 | 2/1977 | Soteropulos et al. | 280/506 |
| 4,613,149 | 9/1986 | Williams, Jr. | 280/508 |
| 4,844,497 | 7/1989 | Allen | 280/508 X |
| 5,011,176 | 4/1991 | Eppinette | 280/479.3 |

FOREIGN PATENT DOCUMENTS 946873  5/1974  Canada.

*Primary Examiner*—Margaret A. Focarino
*Assistant Examiner*—Carla Mattix

[57] ABSTRACT

A self aligning hitching device having a tongue support mountable on a vehicle or vehicle hitch. The tongue support has a mounting support so that the tongue support can easily be mounted on a vehicle. A tongue is provided that is mounted in the tongue support and is slideably free floating when in the unlocked position. It is at this time the connection is made between the towed & towing vehicles. Both the tongue and tongue support have wedging surfaces that guide the tongue now connected to a wedged or fully seated position at which time a spring biased locking pin secures them both together so that a towing vehicle carrying the tongue support and a towed vehicle connected to the tongue are now joined and ready for a towing movement.

14 Claims, 2 Drawing Sheets

SELF ALIGNING HITCH

This invention relates to hitches and in particular to releasable hitches of the fast coupling type, wherein a towed vehicle is coupled to a towing vehicle with a minimum of time and effort.

BACKGROUND OF THE INVENTION

Ever since vehicles, implements or other loads were to be transferred from one location to another by towing there was the requirement that they be connected or coupled together. Problems arose when the load to be towed was of a considerable size and weight. The points of connection were invariably not lined up and therefor the connecting could not be completed. Often many attempts had to be made for alignment or the towing vehicle or the towed load had to be moved until alignment was achieved to enable coupling. These procedures generally involved two people and sometimes produced disastrous results.

Many attempts have been made for alignment by providing sighting means, funnel shaped guides as well as jointed connecters and other means. The devices known to applicant which are considered the most closely related are found in U.S. Pat. No. 5,011,176 and Canadian patent 946,873.

The patent "176" teaches a vehicle with a towing bar, a telescopic arm received in the bar for longitudinal movement and an articulating arm pivotally connected to the telescopic arm for lateral pivoting movement. Once the connection is made and tension put on the hitch the arms line up and the anti pivot collar is slid back to prevent pivoting of the pivoted joint. The telescopic arm may also be fixed in a desirable position in the towing bar. Applicants device differs in that the longitudinal and lateral movement for hookup are provided by a free floating tongue followed by guided movement of the tongue in the tongue support in the initial stage plus a wedging action by engagement of wedging faces on the tongue with wedging faces on the tongue support in the final stage before lock-up of the tongue and tongue support by insertion of the lock-up draw pin which passes through the tongue and tongue support.

The patent "873" teaches a hitch mounted on a towing vehicle with a moveable tongue supported in a tongue support for controlled lateral and longitudinal movement for hook-up. Both movements are controlled by a pin passing through the tongue support and simultaneously through a slot in the tongue. As previously pointed out applicants device differs in that the longitudinal and lateral movements required for hook-up are provided by a free floating tongue followed by a guided movement of the tongue in the tongue support followed by a cooperation of wedging faces on the tongue with wedging faces on the tongue support which places the tongue in the lock-up position to receive the lock-up draw pin for a completed hook-up.

SUMMARY OF THE INVENTION

The present invention provides a novel device for fast, safe easy coupling of a towed vehicle to a towing vehicle. The device can be mounted on either vehicle with identical results. By way of example the device is mounted to a hitch receptacle on a towing vehicle. The device includes a tongue support mounted to the vehicles hitch receptacle by a horizontal mounting projection. A free floating tongue while supported in the tongue support is slideably and pivotally moveable so that a coupler ball in the distal or free end of the tongue may be engaged by a coupler clamp attached to a vehicle to be towed. The tongue has guiding surfaces to be engaged by wedging surfaces on the tongue support when rearward movement of the towing vehicle takes place after the coupling. The tongue also has wedging surfaces to be engaged by the wedging surfaces of the tongue support as the towing vehicle is further moved rearwardly until there is a final fully wedged position. It is at this point that a locking draw pin is passed through aligned apertures in the tongue support and tongue to complete the hook-up.

In view of the above summary it is readily discernible that a primary object of the present invention is to provide a self aligning hitch.

It is a further object of the present invention to eliminate the requirement of a second person in hooking up a towed vehicle.

It is a further object of the present invention to promote safety through the avoidance of accidents which frequently occur when repeated backing or repositioning is necessary.

It is a further object of the present invention to expedite the hook-up process.

It is yet a further object of the present invention to provide a hitch that is rugged yet simple in construction.

These and other objects of the present invention will become readily apparent as the following description is read in conjunction with the accompanying drawings wherein like reference numerals indicate like elements throughout the several views.

Figure 1:
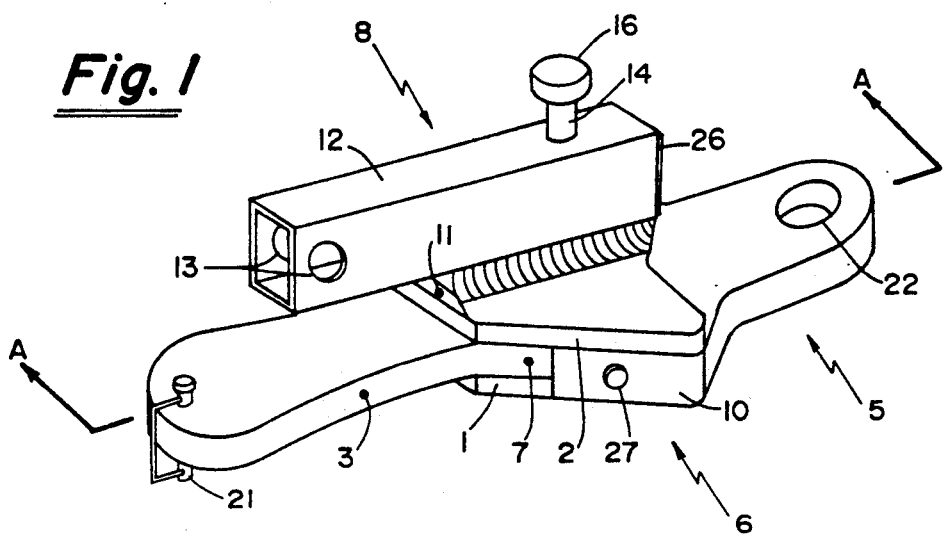
FIG. 1 is perspective view of a first embodiment of the coupling device.

Referring now to the drawings we can see that we have shown two types of tongues, one basic type of tongue support, two types of mounting means and locking means.

For a more detailed description we now look at FIG. 1 which is a perspective view of a complete self aligning coupling device. There is a planar tongue 5 capable of slideably floating in the tongue support 6 in the initial stages of self aligning with a wedging action taking place between first wedging surfaces 7 on the tongue 5 and second wedging surfaces on the tongue support wedging plates 10 in the final stages of alignment up to and including the final point where a locking draw pin 14 mounted in a tongue support mounting means 8 passes through the draw pin apertures 9 in tongue support 6 and draw pin aperture 18 in tongue 5 (see FIG. 2) enabling a coupling force to be transferred from a towing vehicle to a towed vehicle (vehicles not shown). The coupling or towing force is transferred from a well known type of hitch on the towing vehicle by a hitch pin passing through tongue support mounting apertures 13, through the aligned and locked tongue 5, by a locking draw pin 14 to a coupler means on tongue 5 in the form of a coupler ball 19 and coupler ball housing clamp 20 mounted on the towed vehicle. While an aperture 22 in the distal end of tongue 5 has been shown for receiving a coupler ball 19 it would make no difference having the coupler ball housing clamp 20 mounted in that location. The tongue 5 slideably floating in the tongue support 6 is prevented from sliding completely out by a quick release retainer pin 21 at a proximal end of the tongue 5 mounted in quick release retainer pin mounting aperture 23. With the quick release pin 21 removed and the locking draw pin 14 lifted to an unlocked position the tongue 5 may be completely removed. The tongue 5 more clearly shown in FIG. 3 has curvilinear aligning or guiding lateral edge surfaces 3 adjacent lateral edge flat wedging surfaces 7. Supporting the tongue 5 is tongue support 6 formed from a top plate 2 and a bottom plate 1 separated by wedging plates 10. In each wedging plate 10 is an inwardly biased side locking pin 27 to engage a locking pin notch 28 in tongue 5 which can act in addition to locking draw pin 14 or in fact replace it as the sole locking means. Mounted on top of tongue support upper plate 2 is a spacer 11 on top of which is mounted the tongue support mounting means which is generally a square support mounting tube 12 to fit a common towing hitch mounted to the frame of a towing vehicle. As previously pointed out a hitch pin passes through the vehicle hitch and through the tongue support mounting apertures 13 to fix the coupling device to a towing or towed vehicle. The support mounting tube 12 is closed at one end by a protector end cap 26 and has mounted therein a helical compression spring 15 which biases locking draw pin 14 with handle 16 towards a tongue engaging position. The helical compression spring 15 applies its downward force to the locking draw pin 14 through retainer washer 17 fixed in a groove in draw pin 14.

Figure 2:
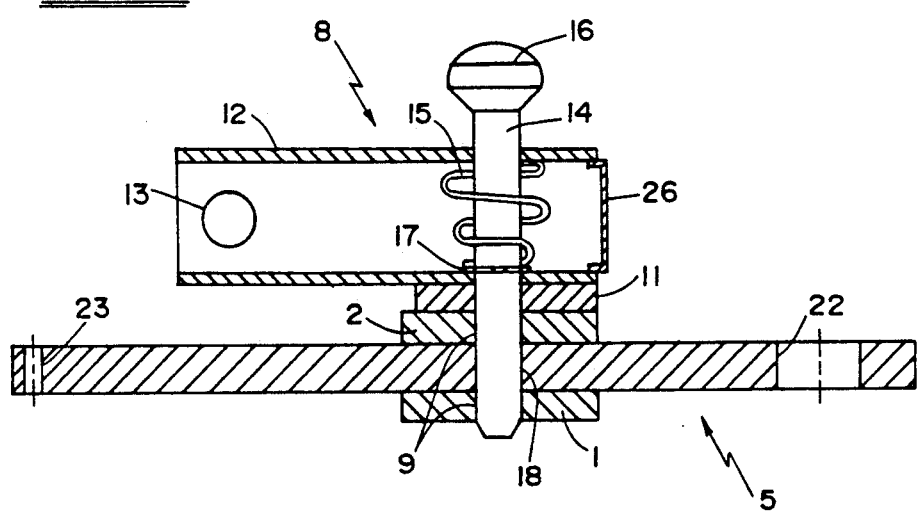
FIG. 2 is a vertical mid cross section of FIG. 1 as defined by cutting plane A—A in FIG. 1. A portion of the cutting plane symbol has been omitted for clarity.

Referring now to FIG. 2 which is a vertical mid cross section of FIG. 1 as defined by A—A, there is shown the tongue 5 in the locked position with quick release retainer pin aperture 23 at a proximal end and coupler ball aperture 22 at a distal end and a locking draw pin 14 passing through locking draw pin aperture 18 in an intermediate tongue portion. The tongue support lower plate 1 and tongue support upper plate 2 slideably support the tongue 5 until in its final locking wedged position and include draw pin apertures 9 to allow passage of locking draw pin 14. A spacer 11 is mounted on tongue support upper plate 2 to provide ample space for the tongue support mounting tube 12 mounted thereon to engage a well known trailer hitch receptacle. The tongue support mounting tube 12 is closed at one end by a protector end cap 26 and carries a locking draw pin 14 with lifting handle 16 which is biased by a helical or spiral compression spring 15. As previously pointed out the helical compression spring 15 applies its downward force to the locking draw pin 14 through retainer washer 17 fixed in a groove in draw pin 14. The end of tongue support mounting tube 12 opposite the end closed by protector end cap 26 includes 2 aligned apertures 13 (only one shown), to receive a hitch pin (not shown) of a common trailer hitch.

Figure 3:
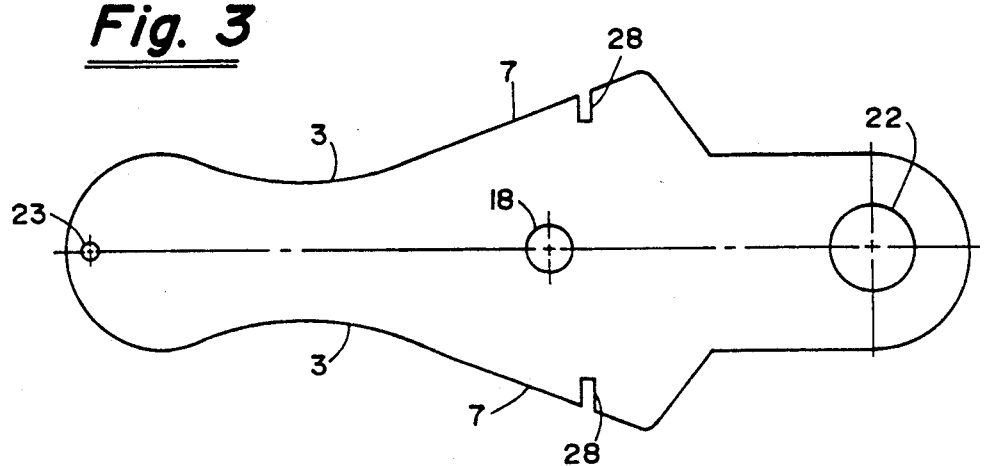
FIG. 3 is a plan view of the tongue of the coupling device.

Turning now to FIG. 3, a plan view of the tongue 5, reveals a quick release retainer pin aperture 23 at a proximal end, a coupler ball aperture 22 at a distal end and a draw pin aperture 18 in an intermediate portion thereof, proceeding from the proximal end there are two lateral edges each containing a curvilinear portion 3 for guiding or aligning the tongue 5 while it is sliding in a free floating manner initially, then follows a wedging portion 7 which cooperates with tongue support wedging plates 10 to finally guide and wedge the tongue 5 to a location where it is locked by locking draw pin 14. As illustrated there is in the lateral edge wedge surface 7 if desired or required a side locking pin notch 28 which will be engaged by a biased side locking pin 27 shown in FIG. 1 as mounted on and passing through tongue support wedging plates 10.

Figure 4:
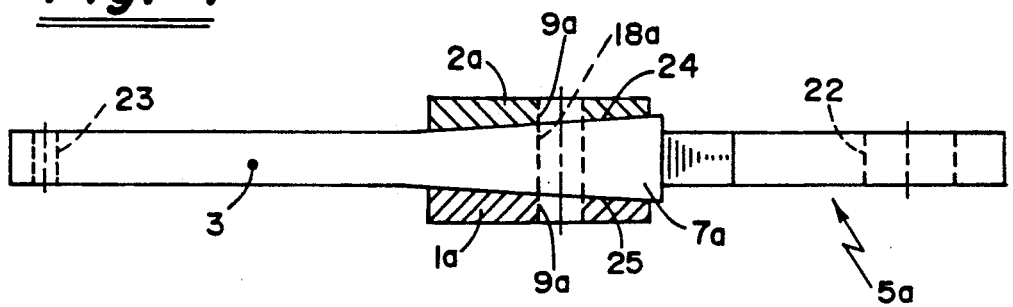
FIG. 4 is a side elevation of a modified tapered tongue with the upper and lower plates of the tongue support in cross section.

Looking now at FIG. 4 there is taught a modified form of tongue 5 which is designated 5a. This modified tapered tongue 5a includes the original proximal end aperture 23, the distal end aperture 22 and curvilinear lateral guiding edge portion 3. Included in the modified tapered tongue 5a are tapered tongue support lower plate 1a, tapered tongue support upper plate 2a having tapered tongue engaging surfaces 25 and 24 and aligned locking draw pin apertures 9a. Also included are the tapered tongue lateral wedge surfaces 7a.

Figure 5:
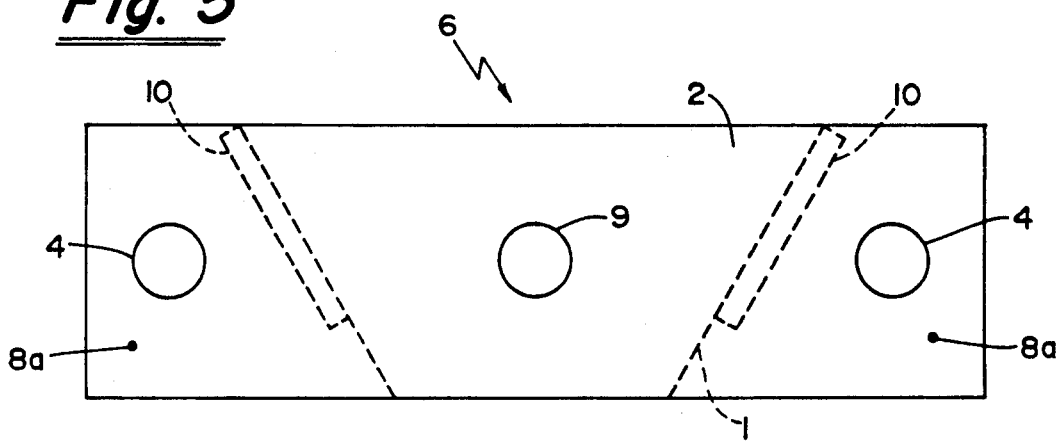
FIG. 5 is a plan view of the tongue support with modified tongue support mounting means as lateral extensions of the tongue support.

For an original tongue support 6 with a modified tongue support mounting means 8a we must look to the FIG. 5 plan view. The tongue support upper plate 2 lower plate 1, tongue support wedging plates 10 and apertures 9 are as found in the original tongue support. Added to each end of the original tongue support for mounting are modified tongue support mounting means 8a which carry modified tongue support mounting apertures 4. This modified device is required for mounting on vehicles that have no regular trailer hitch receptacle but will of course receive the tongue of FIG. 3 to operate in the normal manner.

Figure 6:
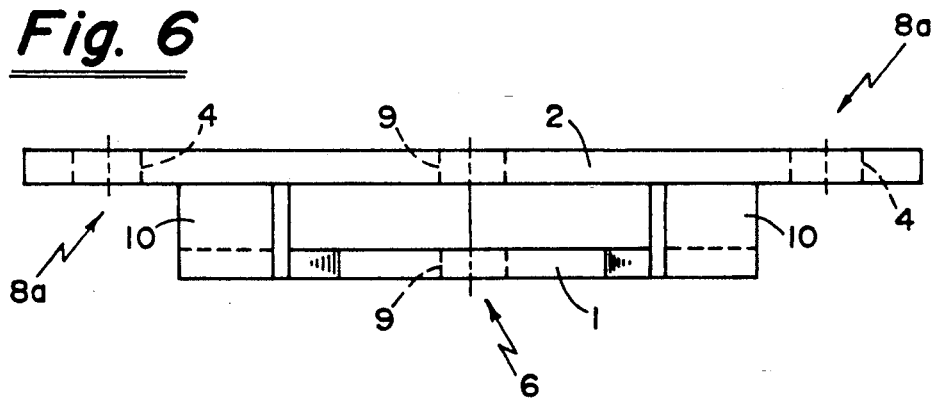
FIG. 6 is a front elevation of the tongue support with modified lateral mounting means as shown in FIG. 5.

A front elevation view of the modified embodiment of FIG. 5 is illustrated in FIG. 6. All the plates 1, 2, 10 with accompanying apertures as for the original tongue support 6, have been included. Attached thereto at each end are the modified tongue support mounting means 8a with accompanying mounting apertures 4. The original tongue 5 of course slides between the support upper and lower plates 2 and 1 respectively in a free floating manner until wedged into a final position against tongue support wedging plates 10 at which time the locking draw pin 14 passes through the aligned apertures 9, 18 and 9.

Figure 7:
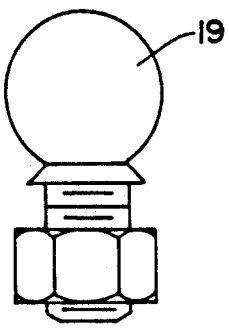
FIG. 7 is a front elevation of a standard coupler ball.
Figure 8:
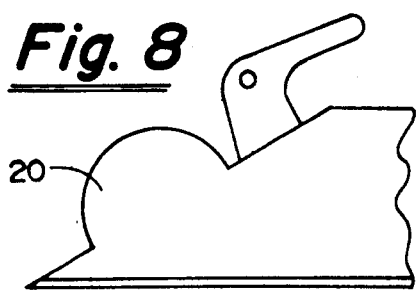
FIG. 8 is a side elevation of a standard coupler ball housing clamp to receive the standard coupler ball of FIG. 7.

Referring now to FIGS. 7 and 8 there is shown a well known coupler bal in FIG. 7 and a cooperating well known coupler ball housing clamp in FIG. 8. For purposes of illustration only the coupler ball 19 can be placed in the coupler ball aperture 22 but it is to be expected of anyone skilled in the art to exchange the coupler ball 19 with the coupler ball housing clamp and to mount the total self aligning coupler device on the towed or towing vehicle.

OPERATION

Using the self aligning coupling device as illustrated in FIG. 1 as an example, the device may be mounted on a standard vehicle trailer hitch of a towing vehicle having a square tubular receptacle. The tongue support mounting tube 12 is slid into the hitch receptacle where a hitch pin (not shown) passes through aligned apertures in the hitch receptacle and apertures 13 thereby fastening the self aligning coupling device to the trailer hitch. The locking draw pin 14 is now raised allowing the tongue 5 to slideably float freely in the tongue support 6. With a coupler ball 19 mounted in coupler ball aperture 22 the towing vehicle is backed up to a vehicle to be towed having a coupler ball housing clamp 20 mounted thereon. The coupler ball 19 on tongue 5 can now easily be placed directly under the coupler ball housing clamp 20, the clamp 20 is lowered onto the ball 19 and securely latched. A further backing of the towing vehicle allows lateral edge guiding portions 3 to cooperate with tongue support wedging plates 10 for alignment. As further backing of the towing vehicle progresses tongue lateral wedging surface 7 cooperate with tongue support wedging plates 10 until the tongue 5 is wedged tightly in position at which time the spring biased locking draw pin 14 which was riding on the upper surface of the tongue 5 will now pass through tongue draw pin aperture 18 and tongue draw pin aperture 9 in the lower plate, thereby coupling the towing vehicle to the towed vehicle.

Various modifications such as size, shape and arrangement of components may be made without departing from the spirit and scope of the invention. The above disclosure shall be interpreted as illustrative only and limited only by the scope of the invention as defined in the following claims.

What I claim is:

1. A self aligning coupling device for connecting a towed vehicle to a towing vehicle comprising in combination a tongue support means including an integrally joined and spaced upper member, lower member and two side members, and further including inner wedging surfaces on at least said two side members, said tongue support means having two open ends, a planar tongue means freely slidably supported between said integrally joined and spaced members and protruding out of and beyond both of said two ends simultaneously during all operational sliding movements, said planar tongue means including notched wedging surfaces for engaging said inner wedging surfaces, inwardly biased detent means carried by said two side members to engage said notched wedging surfaces for locking said tongue support means and said planar tongue means together when said notched wedging surfaces and said inner wedging surfaces are fully engaged and means for mounting and means for coupling said self aligning coupling to one of said towed or towing vehicles.

2. A self aligning coupling device as claimed in claim 1 wherein said mounting means are integrally formed with said tongue support means.

3. A self aligning coupling device as claimed in claim 2 wherein said planar tongue protruding ends each includes an aperture.

4. A self aligning coupling device as claimed in claim 3 wherein one of said protruding tongue end apertures has mounted therein a quick release retainer pin, the other of said protruding tongue end apertures has mounted therein said means for coupling in the form of a coupler ball.

5. A self aligning coupling device as claimed in claim 4 wherein said tongue support means inner wedging surfaces further includes inner wedging surfaces on said upper member, and said lower member.

6. A self aligning coupling device for connecting a towed vehicle to a towing vehicle comprising in combination, a tongue support means including an integrally joined and spaced upper member, lower member and two side members and further including inner wedging surfaces on at least said two side members, said tongue support means having two open ends, a planar tongue means freely slidably supported within said tongue support means and protruding out of and beyond both of said two ends simultaneously during all operational sliding movements, said planar tongue means including wedging surfaces for engagement with said inner wedging surfaces on at least said two side members, locking means on said tongue support means for simultaneously engaging said tongue support means and said planar tongue means for preventing relative movement therebetween when said wedging surfaces and said inner wedging surfaces are fully engaged, and mounted means joined to said tongue support means for mounting said self aligning coupling to one of said towed or towing vehicles.

7. A self aligning coupling device as claimed in claim 6 wherein said planar tongue means is formed of a proximal end, a distal end and an intermediate portion each of which includes an aperture transverse to said planar tongue means.

8. A self aligning coupling device as claimed in claim 7 further including a quick release retainer pin mounted to said proximal end aperture for easy complete removal of said planar tongue means from said tongue support means when said retainer pin is removed.

9. A self aligning coupling device as claimed in claim 8 wherein said locking means includes a biased locking draw pin and wherein said tongue support means includes aligned apertures, whereby locking occurs when said biased locking draw pin engages and simultaneously passes through said aligned apertures and said intermediate portion aperture.

10. A self aligning coupling device as claimed in claim 9 wherein said mounting means includes extensions of said tongue support means.

11. A self aligning coupling device as claimed in claim 9 wherein said mounting means includes a mounting tube with mounting apertures therein fixed to said tongue support means.

12. A self aligning coupling device as claimed in claim 11 wherein said inner wedging surfaces further includes wedging surfaces on said upper member and said lower member and wherein said planar tongue means includes wedging surfaces thereon for engaging said further wedging surfaces of said upper and lower members.

13. A self aligning coupling device as claimed in claim 6 wherein said planar tongue means further includes curvilinear guiding surfaces contiguous with said wedging surfaces to aid in initial alignment of said planar tongue means in said tongue support means.

14. A self aligning coupling device as claimed in claim 7 wherein said distal end aperture has mounted therein a coupler ball.

* * * * *